US011710993B2

(12) United States Patent
Coppola et al.

(10) Patent No.: US 11,710,993 B2
(45) Date of Patent: Jul. 25, 2023

(54) ELECTRIC MACHINES WITH FEATURES FOR ENHANCING LOAD TRANSFER PERFORMANCE OF STACKED-LAMINATE ROTORS

(71) Applicant: GM GLOBAL TECHNOLOGY OPERATIONS LLC, Detroit, MI (US)

(72) Inventors: Anthony M. Coppola, Rochester Hills, MI (US); Alireza Fatemi, Canton, MI (US); Yew Sum Leong, Northville, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 324 days.

(21) Appl. No.: 17/082,555

(22) Filed: Oct. 28, 2020

(65) Prior Publication Data

US 2022/0131431 A1    Apr. 28, 2022

(51) Int. Cl.
*H02K 1/27* (2022.01)
*H02K 15/03* (2006.01)
(Continued)

(52) U.S. Cl.
CPC .............. *H02K 1/276* (2013.01); *H02K 15/03* (2013.01); *H02K 21/14* (2013.01)

(58) Field of Classification Search
CPC ...... H02K 21/14; H02K 1/276; H02K 1/2766; H02K 15/03; H02K 2213/03
(Continued)

(56) References Cited

U.S. PATENT DOCUMENTS 2,990,508 A    6/1961 Thompson
4,570,333 A *  2/1986 Jones .................... H02K 1/276
                                                        29/515
(Continued)

FOREIGN PATENT DOCUMENTS

CN    103779995 B  * 11/2017  .......... H02K 1/2773
CN    107659012 A  *  2/2018
(Continued)

OTHER PUBLICATIONS

Translation of foreign Patent document DE 102005047771 A1 (Year: 2007).*

*Primary Examiner* — Alex W Mok
(74) *Attorney, Agent, or Firm* — Quinn IP Law (57) ABSTRACT

An electric machine includes a stator with stator slots securing therein electrically conductive windings. A rotor is rotatably mounted adjacent the stator and includes a stack of rotor laminates. Each laminate includes circumferentially spaced poles, each of which includes a magnet slot spaced from an insert slot. These laminate magnet slots cooperatively define the rotor's magnet slots. Likewise, the laminates' insert slots cooperatively define the rotor's insert slots. Magnets are mounted inside the rotor's magnet slots, and non-magnetic inserts are mounted inside the rotor's insert slots. One or more poles of each laminate includes a structural web that extends radially through the magnet and insert slots of that pole. Multiple poles of each rotor laminate lack a radially extending structural web. Each rotor laminate is rotated with respect to a neighboring rotor laminate such that each pole with a structural web axially aligns with a pole without a structural web.

20 Claims, 5 Drawing Sheets

(51) Int. Cl.
*H02K 21/14* (2006.01)
*H02K 1/276* (2022.01)

(58) Field of Classification Search
USPC .................................................. 310/156.56
See application file for complete search history.

(56) References Cited

U.S. PATENT DOCUMENTS

| | | | |
|---|---|---|---|
| 5,166,568 A | 11/1992 | Nystuen et al. | |
| 6,163,127 A | 12/2000 | Patel et al. | |
| 6,384,507 B1 * | 5/2002 | Lee .................... | H02K 7/088 310/44 |
| 6,674,205 B2 | 1/2004 | Biais .................... | B60L 15/20 335/286 |
| 7,969,058 B2 | 6/2011 | Rahman et al. | |
| 8,120,223 B2 | 2/2012 | Leonardi et al. | |
| 8,928,197 B2 | 1/2015 | Jurkovic et al. | |
| 8,933,606 B2 | 1/2015 | Rahman et al. | |
| 9,035,522 B2 | 5/2015 | Liang et al. | |
| 9,041,261 B2 * | 5/2015 | Yamamoto ............... | H02K 1/27 310/58 |
| 9,088,189 B2 * | 7/2015 | Buskirk ............... | H02K 1/2766 |
| 9,577,481 B2 * | 2/2017 | Kolehmainen ......... | H02K 1/246 |
| 9,941,756 B2 * | 4/2018 | Kolehmainen ...... | H02K 15/022 |
| 10,476,328 B2 * | 11/2019 | Mazza ................. | H02K 1/2766 |
| 2006/0017345 A1 | 1/2006 | Uchida et al. | |
| 2007/0216249 A1 | 9/2007 | Gruendel et al. | |
| 2007/0278883 A1 * | 12/2007 | Marcenaro ........... | H02K 17/165 310/90 |
| 2008/0272667 A1 * | 11/2008 | Ionel ..................... | H02K 21/46 310/156.83 |
| 2009/0045688 A1 | 2/2009 | Liang et al. | |
| 2009/0224624 A1 * | 9/2009 | Kumar ................... | H02K 1/246 310/156.53 |
| 2010/0244610 A1 | 9/2010 | Hao et al. | |
| 2011/0062902 A1 | 3/2011 | Patel et al. | |
| 2011/0109180 A1 | 5/2011 | Akutsu et al. | |
| 2011/0169363 A1 | 7/2011 | Summers et al. | |
| 2011/0198962 A1 | 8/2011 | Tang | |
| 2013/0147303 A1 | 6/2013 | Kaiser et al. | |
| 2013/0241339 A1 * | 9/2013 | Buskirk ............... | H02K 1/2766 310/156.53 |
| 2013/0270952 A1 | 10/2013 | Jurkovic et al. | |
| 2014/0103768 A1 * | 4/2014 | Brahmavar ........... | H02K 15/03 29/598 |
| 2014/0117791 A1 * | 5/2014 | Fiseni .................... | H02K 29/12 29/598 |
| 2014/0252903 A1 * | 9/2014 | Rahman ................. | H02K 21/14 310/156.53 |
| 2018/0351424 A1 * | 12/2018 | Mazza ................. | H02K 1/2766 |
| 2020/0177038 A1 * | 6/2020 | Fröhlich .................. | H02K 1/28 |
| 2020/0195071 A1 | 6/2020 | Fatemi et al. | |

FOREIGN PATENT DOCUMENTS

| | | | | |
|---|---|---|---|---|
| CN | 103795168 B | * | 5/2018 | ............... H02K 1/16 |
| DE | 102005047771 A1 | * | 4/2007 | ........... H02K 1/2766 |
| DE | 102014019217 A1 | * | 6/2016 | |
| EP | 1100186 A2 | * | 5/2001 | ............... E03D 1/14 |
| EP | 2451049 A1 | * | 5/2012 | ............. H02K 1/276 |

* cited by examiner

ELECTRIC MACHINES WITH FEATURES FOR ENHANCING LOAD TRANSFER PERFORMANCE OF STACKED-LAMINATE ROTORS

INTRODUCTION

The present disclosure relates generally to electric machines. More specifically, aspects of this disclosure relate to multiphase, alternating current permanent magnet motor-generator units with stacked-laminate rotor assemblies reinforced with polymeric inserts.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric vehicle (HEVs) and full electric vehicles (FEVs), on the other hand, utilize alternative power sources to propel the vehicle and, thus, minimize or eliminate reliance on a fossil-fuel based engine for tractive power.

A full electric vehicle (FEV)—colloquially labeled an "electric car"—is a type of electric-drive vehicle configuration that altogether omits the internal combustion engine and attendant peripheral components from the powertrain system, relying on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

There are three primary types of electric machines used for traction motors in modern electric-drive vehicle powertrains: brushed direct current (DC) motors, brushless DC permanent magnet (PM) motors, and multiphase alternating current (AC) PM motors. Permanent magnet motors have a number of operating characteristics that make them more attractive for use in vehicle propulsion applications when compared to their available counterparts, including high efficiency, high torque, high power densities, and a long constant-power operating range. A PM motor is an electric machine that converts electrical energy into rotational mechanical energy using a stator with multiphase electromagnetic windings, and a rotatable rotor that bears an arrangement of permanent magnets. Permanent magnet motors may be categorized to DC or AC, rotary or linear, and radial flux or axial flux. In radial flux PM motor designs, the magnet-bearing rotor may be coaxially nested inside the stator or situated outside the stator. Alternatively, a PM motor may take on an axial flux arrangement in which the stator and rotor are facing, coaxial disks. The rotor, which has multiple surface-mounted or interior-mounted permanent magnets, is separated from the stator by a small air gap. Rotation of the rotor is effected by a magnetic field, produced by the flow of current through the stator windings, interacting with a magnetic field produced by the rotor's permanent magnets.

A stacked-laminate, rotary-type PM motor employs an internal rotor assembly that is constructed from a stack of conductive metallic plates that are laminated together, for example, via a suitable adhesive. Once assembled, the stacked laminate plates define internal cavities within which are nested permanent magnet material to establish magnetic rotor barriers. To reduce flux leakage and improve rotor saliency, a pattern of "empty" barrier cavities is intermingled with the magnet-bearing cavities inside the rotor structure to define a multi-barrier design. When the rotor spins at high speeds, however, elevated levels of material stress may form in rotor material bridges between the magnetic rotor barriers and the empty cavities. A simple solution to this mechanical stress problem would be to make the rotor bridges thicker; doing so, however, may diminish the torque producing performance of the motor by reducing magnetic flux as the thicker bridges "short circuit" the magnets residing in adjacent cavities, and by degrading the saliency characteristics of the rotor. An alternative solution is to fill the barrier cavities with a non-magnetic reinforcement material that structurally reinforces the rotor material bridges.

SUMMARY

Presented herein are electric machines with stacked rotor laminates that exhibit enhanced load transfer performance, methods for making and methods for operating such electric machines, and vehicles with stacked-laminate, rotary-type PM motors with features that enhance load transfer between the rotor laminates and polymeric reinforcements. By way of example, an internal rotor assembly incorporates geometric features that are positioned throughout the rotor stack and, for some configurations, vary along the rotational axis of the rotor to promote load transfer between the individual laminations and the rotor-slot-borne polymeric reinforcement inserts. The geometric feature may include a structural web that extends radially through the multi-barrier slots of a single pole of each rotor laminate. During stacking, the laminates are angularly offset from one another (e.g., rotated 60 degrees (°) in a six-pole design) such that each pole of the resultant rotor stack has at least one structural web. As an additional or alternative option, the barrier-defining slots of each rotor laminate may include radially projecting protrusions and/or radially recessed indentations to increase the contact surface area between the slots and the inserts. Another option for increasing contact surface area includes varying the size and/or location of the laminate barrier slots with respect to the barrier slots of neighboring rotor laminates. These geometric features help to increase the structural integrity of the rotor assembly while minimizing magnetic flux leakage and increasing torque and power output of the electric machine.

Aspects of this disclosure are directed to electric machines, such as motors, generators, transformers, inductors, dynamometers, converters, etc., with rotor laminates that exhibit enhanced load transfer characteristics. For instance, a stacked-laminate, rotary-type electric machine includes a stator with multiple circumferentially spaced, radially elongated stator winding slots. Electrically conductive windings, such as multiphase U-shaped hairpin windings, are disposed in these winding slots. The electric machine also includes a rotor that is rotatably mounted adjacent the stator. For at least some applications, the rotor may be rotatably disposed inside of and, thus, circumscribed by the stator. The rotor is fabricated from a stack of rotor laminates, each of which includes a series of circumferentially spaced poles. Each laminate pole is defined by one or more magnet slots that are radially spaced from one or more insert slots. When stacked, these laminate magnet slots axially align with one another to cooperatively define the rotor's magnet slots. Likewise, the laminates' insert slots axially align with one another to cooperatively define the rotor's insert slots. Magnetic material, such as individual permanent magnet bars, are mounted inside the rotor's magnet slots. Non-magnetic material, such as polymeric reinforcement inserts, are mounted inside the rotor's insert slots.

Continuing with the discussion of the foregoing example, one or more (first) of the magnetic poles of each rotor laminate includes an elongated structural web that extends radially through some or all of the magnet and insert slots of that pole. Conversely, one or more (second) poles of each rotor laminate lacks a radially extending structural web. For some configurations, only a single pole of each rotor laminate is fabricated with a structural web; all remaining poles of that laminates lack a structural web. Moreover, each rotor laminate may be fabricated as a flat, circular metallic disk, and the structural web may be integrally formed with the circular metallic disk as a single-piece, unitary structure, e.g., having an axial thickness of about 0.3-1.1 mm. When assembled, each rotor laminate in the laminate stack is rotated with respect to its neighboring rotor laminate(s) such that each pole with a structural web axially aligns with a neighboring pole that lacks a structural web.

Additional aspects of this disclosure are directed to motor vehicles with stacked-laminate, rotary-type motors with features that enhance load transfer between the rotor laminates and polymeric reinforcement inserts. As used herein, the terms "vehicle" and "motor vehicle" may be used interchangeably and synonymously to include any relevant vehicle platform, such as passenger vehicles (ICE, REV, FEV, fuel cell, fully and partially autonomous, etc.), commercial vehicles, industrial vehicles, tracked vehicles, off-road and all-terrain vehicles (ATV), motorcycles, e-bikes, e-scooters, farm equipment, trains, watercraft, aircraft, etc. For non-automotive applications, disclosed concepts may be employed for any logically relevant use, including stand-alone power stations, commercial or residential generators, pumping equipment, machine tools, appliances, etc. In an example, a motor vehicle includes a vehicle body with a passenger compartment, multiple road wheels mounted to the vehicle body, and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to thereby propel the vehicle.

Continuing with the discussion of the above motor vehicle example, each traction motor includes an annular stator with multiple stator winding slots, and multiple electrically conductive windings disposed in the stator winding slots. A cylindrical rotor is rotatably mounted inside a hollow core of the stator. The rotor includes a stack of rotor laminates, each of which is a metallic circular disk with multiple circumferentially spaced poles. Each non-salient magnetic pole is defined by at least one laminate magnet slot that is radially spaced from at least one laminate insert slot. The magnet slots of the rotor laminates axially align with one another to cooperatively define multiple rotor magnet slots of the rotor. In a similar manner, the insert slots of the rotor laminates cooperatively define multiple rotor insert slots of the rotor. Permanent magnets are mounted inside the rotor magnet slots, and non-magnetic polymeric inserts are mounted inside the rotor insert slots.

One or more (first) poles of each rotor laminate includes a structural web that extends radially through some or all of the laminate magnet slot(s) and the laminate insert slot(s) of that pole. On the other hand, one or more (second) poles of each rotor laminate lacks the radially extending structural web. When the rotor is assembled, a first rotor laminate in the laminate stack is angularly offset with respect to a neighboring second rotor laminate such that the first rotor laminate's (first) pole with the structural web axially aligns with the (second) pole of the second rotor laminate without the structural web. Likewise, the (first) pole of the second rotor laminate with the structural web axially aligns with the (second) pole of the first rotor laminate without the structural web. A third, fourth, fifth, sixth, etc., rotor laminate in the laminate stack may each be angularly offset with respect to its neighboring rotor laminate(s) in a similar manner.

Aspects of this disclosure are also directed to methods for manufacturing and methods for operating disclosed electric machines, PM motors, powertrains, and/or vehicles. In an example, a method is presented for assembling an electric machine. This representative method includes, in any order and in any combination with any of the above and below disclosed options and features: receiving a stator defining multiple stator winding slots; positioning electrically conductive windings in the stator winding slots; movably mounting a rotor adjacent the stator, the rotor including a stack of rotor laminates each including circumferentially spaced poles, each of the poles defined by a laminate magnet slot spaced from a laminate insert slot, the laminate magnet slots cooperatively defining rotor magnet slots, and the laminate insert slots cooperatively defining rotor insert slots; mounting multiple magnets inside the rotor magnet slots; and mounting multiple non-magnetic inserts mounted inside the rotor insert slots. A first pole of the poles of each of the rotor laminates includes a structural web extending radially through the laminate magnet slot and the laminate insert slot of the first pole, and a second pole of the poles of each rotor laminate lacks the radially extending structural web. A first rotor laminate in the stack of laminates is rotated with respect to a second rotor laminate such that the first pole of the first rotor laminate with the structural web axially aligns with the second pole of the second rotor laminate without the structural web, and the first pole of the second rotor laminate with the structural web axially aligns with the second pole of the first rotor laminate without the structural web. As a further option, a third rotor laminate in the stack of laminates is rotated with respect to the first and second rotor laminates such that the first pole of the third rotor laminate with the structural web axially aligns with the poles of the first and second rotor laminates that lack the structural web.

Also disclosed herein is an electric machine that includes a stator defining a plurality of stator winding slots, and a plurality of electrically conductive windings disposed in the stator winding slots. A rotor is rotatably mounted adjacent the stator. The rotor includes a bulk structural material and a stack of rotor laminates. Each laminate includes circumferentially spaced poles, each of which includes multiple slots in the laminate. The slots of a first pole are in a first arrangement, and the slots of a second pole are in a second arrangement different from the first arrangement. A first of the rotor laminates in the stack of rotor laminates is rotated with respect to a second rotor laminate such that the first pole of the first rotor laminate aligns with the second pole of the second rotor laminate so that the bulk structural material within a slot of the second pole of the second laminate is in structural contact with the face of the first laminate.

Aspects of this disclosure are also directed to a rotor assembly for an electric machine. The electric machine includes a stator and an electrically conductive winding disposed in a winding slot defined by the stator. The rotor assembly includes a rotor body that is rotatably mounted adjacent the stator. The rotor body includes a stack of rotor laminates, each of which includes circumferentially spaced poles. Each pole is defined by a plurality of slots in the laminate. The slots of a first pole of each rotor laminate include a first structural arrangement, whereas the slots of a second pole of each rotor laminate include a second structural arrangement distinct from the first structural arrangement. A first rotor laminate in the laminate stack is rotated with respect to a second rotor laminate such that the first pole of the first rotor laminate aligns with the second pole the second rotor and a bulk structural material within one or more of the slots of the second pole of the second rotor laminate contacts an axial face of the first rotor laminate.

Additional aspects of this disclosure are directed to a method of assembling a rotor assembly for an electric machine. The electric machine includes a stator and one or more electrically conductive windings disposed in one or more winding slots defined by the stator. The method includes, in any logically relevant order: stacking a plurality of rotor laminates to define a rotor body, wherein each of the rotor laminates includes circumferentially spaced poles each defined by a plurality of slots in the rotor laminate, wherein slots of a first pole of each of the rotor laminates include a first structural arrangement and slots of a second pole of each of the rotor laminates include a second structural arrangement distinct from the first structural arrangement; rotatably mounting the rotor body adjacent the stator, wherein a first rotor laminate in the stack of rotor laminates is rotated with respect to a second rotor laminate to thereby align the first pole of the first rotor laminate with the second pole the second rotor such that a bulk structural material within a slot of the second pole of the second rotor laminate contacts an axial face of the first rotor laminate.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," along with permutations thereof and similar terms, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 1:
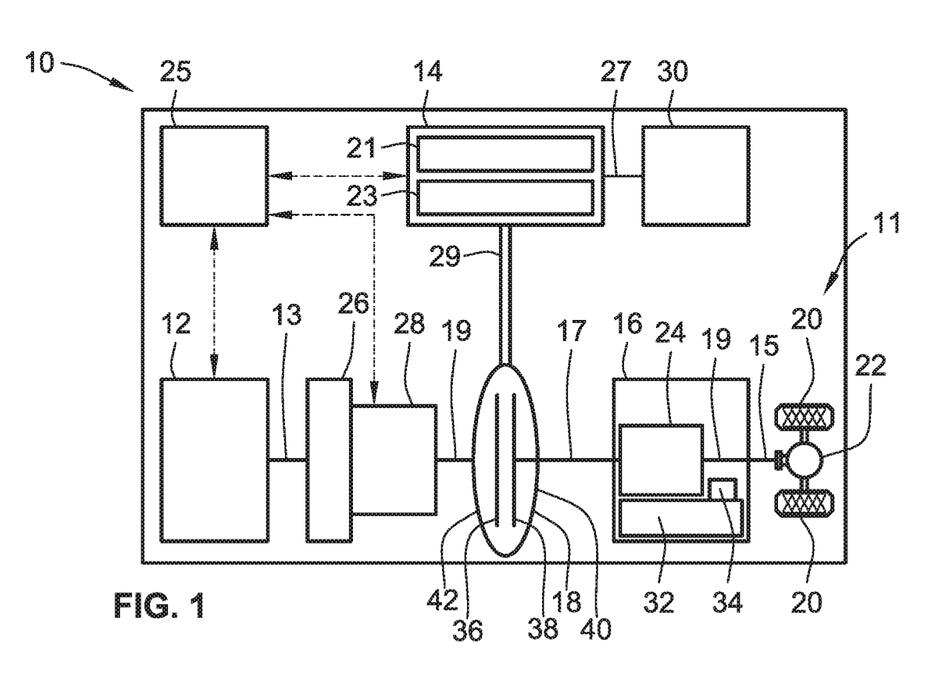
FIG. 1 is a schematic illustration of a representative electric-drive vehicle with a hybrid electric powertrain employing an electric motor/generator unit (MGU) with rotor laminates that exhibit enhanced load transfer performance in accord with aspects of the present disclosure.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel two-clutch (P2) hybrid-electric powertrain. The illustrated automobile 10—also referred to herein as "motor vehicle" or "vehicle" for short—is merely an exemplary application with which novel aspects of this disclosure may be practiced. In the same vein, implementation of the present concepts into a hybrid electric powertrain should also be appreciated as a representative implementation of the novel concepts disclosed herein. As such, it will be understood that facets of the present disclosure may be applied to other powertrain architectures, incorporated into any logically relevant type of motor vehicle, and utilized for both automotive and non-automotive applications alike. Lastly, only select components have been shown and will be described in additional detail herein. Nevertheless, the electric machines, powertrains, and vehicles discussed below may include numerous additional and alternative features, and other available peripheral components, for carrying out the various methods and functions of this disclosure.

The representative vehicle powertrain system is shown in FIG. 1 with a prime mover—represented herein by a restartable internal combustion engine (ICE) assembly 12 and an electric motor/generator unit (MGU) 14—that drivingly connects to a driveshaft 15 of a final drive system 11 by a multi-speed automatic power transmission 16. The engine 12 transfers power, preferably by way of torque via an engine crankshaft 13 ("engine output member"), to an input side of the transmission 16. Engine torque is first transmitted via the crankshaft 13 to rotate an engine-driven torsional damper assembly 26, and concomitantly transferred through the torsional damper assembly 26 to an engine disconnect device 28. This engine disconnect device 28, when operatively engaged, transmits torque received from the ICE assembly 12, by way of the damper 26, to input structure of the TC assembly 18. As the name implies, the engine disconnect device 28 may be selectively disengaged to drivingly disconnect the engine 12 from the MGU 14 (also referred to herein as "traction motor" or simply "motor"), TC assembly 18, and transmission 16.

The transmission 16, in turn, is adapted to receive, selectively manipulate, and distribute tractive power from the engine 12 and motor 14 to the vehicle's final drive system 11—represented herein by a driveshaft 15, rear differential 22, and a pair of rear road wheels 20—and thereby propel the hybrid vehicle 10. The power transmission 16 and torque converter 18 of FIG. 1 may share a common transmission oil pan or "sump" 32 for supply of hydraulic fluid. A shared transmission pump 34 provides sufficient hydraulic pressure for the fluid to selectively actuate hydraulically activated elements of the transmission 16, the TC assembly 18 and, for some implementations, the engine disconnect device 28. It may be preferable, for at least some embodiments, that the engine disconnect device 28 comprise an active clutching mechanism, such as a controller-actuated selectable one-way clutch (SOWC) or friction-plate clutch, or a passive clutching mechanism, such as a ratchet-and-pawl or sprag-type freewheel OWC assembly.

The ICE assembly 12 operates to propel the vehicle 10 independently of the electric traction motor 14, e.g., in an "engine-only" operating mode, or in cooperation with the motor 14, e.g., in "vehicle-launch" or "motor-boost" operating modes. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, six-by-four (6×4) layouts, etc.

FIG. 1 also depicts an electric motor/generator unit ("motor") 14 that operatively connects via a motor support hub, shaft, or belt 29 ("motor output member") to the hydrodynamic torque converter 18. The torque converter 18, in turn, drivingly connects the motor 14 to an input shaft 17 ("transmission input member") of the transmission 16. The motor/generator unit 14 may be directly coupled to a TC input shaft or drivingly mounted to a housing portion of the torque converter 18. The electric motor/generator unit 14 is composed of an annular stator assembly 21 circumscribing and concentric with a cylindrical rotor assembly 23. Electric power is provided to the stator 21 through a high-voltage electrical system, including electrical conductors/cables 27 that pass through the motor housing via suitable sealing and insulating feedthroughs (not illustrated). Conversely, electric power may be provided from the MGU 14 to an onboard traction battery pack 30, e.g., through regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other HEV powertrain configurations, including P0, P1, P2.5, P3 and P4 hybrid powertrains, or may be adapted for an BEV, PHEV, range-extended hybrid vehicle, fuel-cell hybrid vehicle, FEVs, etc.

Power transmission 16 may use differential gearing 24 to achieve selectively variable torque and speed ratios between transmission input and output shafts 17 and 19, respectively, e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts 17, 19. While envisioned as an 8-speed automatic transmission, the power transmission 16 may optionally take on other functionally appropriate configurations, including Continuously Variable Transmission (CVT) architectures, automated-manual transmissions, etc.

Hydrokinetic torque converter assembly 18 of FIG. 1 operates as a fluid coupling for operatively connecting the engine 12 and motor 14 with the internal epicyclic gearing 24 of the power transmission 16. Disposed within an internal fluid chamber of the torque converter assembly 18 is a bladed impeller 36 juxtaposed with a bladed turbine 38. The impeller 36 is situated in serial power-flow fluid communication in juxtaposition with the turbine 38, with a stator (not shown) interposed between the impeller 36 and turbine 38 to selectively alter fluid flow therebetween. The transfer of torque from the engine and motor output members 13, 29 to the transmission 16 via the TC assembly 18 is through stirring excitation of hydraulic fluid, such as transmission oil, inside the TC's internal fluid chamber caused by rotation of the impeller and turbine 36, 38 blades. To protect these components, the torque converter assembly 18 is constructed with a TC pump housing, defined principally by a transmission-side pump shell 40 fixedly attached, e.g., via electron beam welding, MIG or MAG welding, laser welding, and the like, to an engine-side pump cover 42 such that a working hydraulic fluid chamber is formed therebetween.

Figure 2:
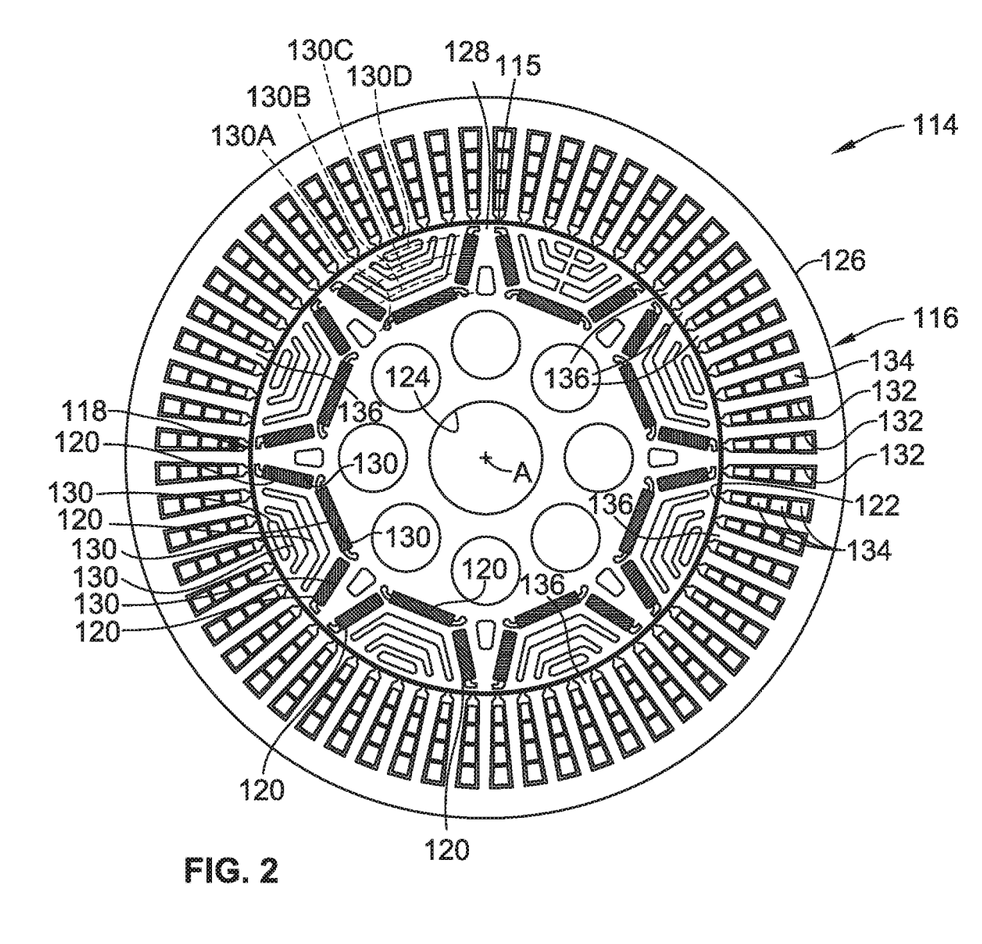
FIG. 2 is an end-view illustration of a representative electric machine with a stacked-laminate internal rotor assembly with rotor laminates that exhibit enhanced load transfer performance in accordance with aspects of the present disclosure.

FIG. 2 illustrates another example of an electric machine 114 that employs magnetic material that exchanges electromagnetic forces with conductive windings to convert electrical energy into mechanical energy, and vice versa. As discussed herein, the electric machine 114 has a multiphase, hairpin-wound stator assembly 116 that nests therein and circumscribes a PM-bearing synchronous reluctance rotor assembly 118. While available for use in automotive and non-automotive applications alike, the electric machine 114 of FIG. 2 may be particularly suited for use in a hybrid-electric powertrain as a traction motor (e.g., motor 14 FIG. 1) with an engine (e.g., ICE assembly 12), and to operate in at least an engine-cranking mode, a regenerative-charging mode, and a torque-assist mode. Electric machine 114 may be designed to achieve: a relatively high efficiency, such as at least about 85% efficiency over a calibrated output power and speed range; a relatively high power density (e.g., greater than about 1500 watts per liter) and torque density (e.g., greater than about 5 Newton-meters per liter); a relatively wide peak power range (e.g., about 4 to 6 kilowatts or greater); a maximum speed of at least about 18,000 rpm; a reduced cost (e.g., by minimizing the number of permanent magnets and increasing efficiency and power output); a reduced mass and inertia (e.g., for fast dynamic response to user output demands); and to fit into a relatively small packaging space. Various alternative embodiments, including alternative rotor assembly architectures and/or alternative stator assembly architectures, may be employed by the electric machine 114 to meet similar or alternative operating parameters.

With continuing reference to FIG. 2, the stator assembly 116 is coaxial with and surrounds the rotor assembly 118 while maintaining a small air gap 115 therebetween. In accord with the illustrated example, this air gap 115 may be not less than about 0.2 millimeters (mm) and not greater than about 1.0 mm, for example, in order to maximize power output and minimize the number of permanent magnets 120 borne by the rotor assembly 118 to provide the desired power output. The representative stator and rotor assemblies 116, 118 of FIG. 2, both of which are portrayed as truncated right-circular cylinders with a generally annular shape, are concentrically aligned about a longitudinal center axis A of the electric machine 114. The stator assembly 116 has a hollow stator core 122 that nests therein the rotor assembly 118; the rotor assembly 118 has a hollow rotor core 124, e.g., that keys, splines, welds, etc., to a motor shaft (e.g., motor output member 29 of FIG. 1). It should be appreciated that a protective motor housing (not shown in FIG. 2) can surround an outer periphery of the stator's body 126 and can support the motor shaft of the electric machine 114.

Rotor assembly 118 of FIG. 2 is fabricated with a rotor body 128 for supporting multiple permanent magnets 120 (twenty-four (24) PMs in the illustrated example) that are circumferentially spaced around the rotor core 124. Specifically, the rotor body 128 is stamped, precision machined, and assembled with multiple rotor slots 130 arranged in radially spaced barrier layers (e.g., four distinct barrier layers). A first barrier layer 130A of slots 130 may be positioned closest to an inner periphery of the rotor body 128, while a fourth barrier layer 130D of slots 130 may be positioned furthest from the rotor body's inner periphery than the other barrier layers. A second barrier layer 130B of slots 130 may be radially interposed between the first and third barrier layers 130A, 130C, while the third barrier layer 130C of slots 130 may be radially interposed between the second and fourth barrier layers 130B, 130D. For at least some embodiments, only select barrier layers (e.g., the first and third barrier layers 130A, 130C) may house magnets 120, while other select barrier layers (e.g., the second and fourth barrier layers 130B, 130D) do not house magnets 120 and, thus, act as flux barriers. In other embodiments, only one or all of the barrier layers may comprise slots storing therein permanent magnets. For example, the three radially innermost barrier layers 130A-130C may be filled with magnets 120 while the radially outermost barrier layer 130D does not include magnets 120. The rotor body 128 may be fabricated from a metallic material, including a high-grade steel material, which is engineered to maintain high-speed rotational stress within predetermined limits.

Stator assembly 116 of FIG. 2 is fabricated with a stator body 126 that has multiple radially aligned, axially elongated, and circumferentially spaced stator slots 132 (e.g., 60 total slots). Each stator slot 132 extends longitudinally through the stator body 126 along the rotational axis A of the electric machine 114. The stator slots 132 house complementary legs of electrically conductive, multiphase stator windings 134. Stator windings 134—also referred to herein as "hairpin windings"—may be grouped into different sets, each of which may carry an identical number of phases of electrical current, such as three, five, six, or seven phases. In addition, the stator windings 134 may extend axially beyond the longitudinal ends of the stator body 126. A ratio of an outer diameter of the stator body 126 to an axial length of the stator assembly 116 (i.e., the distance along the axis A between the body's longitudinal ends not including any extending portion of the stator windings 134) may be not less than 1.5 and not greater than 3.5, for example, to satisfy predetermined packing space constraints for a particular application of the electric machine 114, such as in the vehicle powertrain of FIG. 1.

For ease of manufacture, simplified assembly, and increased costs savings, it may be desirable that all of the permanent magnets 120 share an identical, rectangular polyhedron shape. It should be recognized, however, that any one or more or all of the PM bodies may take on innumerable shapes and sizes, including other polyhedral block-type magnets, ring-shaped (annular) magnets, bread-loaf block-type magnets (cross-section with quadrilateral section adjoining semioval section), curved tile magnets, etc. In one non-limiting example, each permanent magnet 120 may have a thickness of about 1.5 mm to 2.5 mm to fit within a slot 130 having complementary dimensions. In at least one embodiment, a total mass of magnet material (i.e., the mass of all magnets 120) used by the electric machine 114 may be about 150 grams to about 250 grams. By using less magnetic material but still meeting predetermined operating parameters, costs are reduced. The permanent magnets 120 of the electric machine 114 may all be fabricated from the same material, such as Neodymium Iron Boron (NdFeB); alternatively, any one or more or all of the magnets 120 may employ different materials, such as Samarium Cobalt (SmCo), Aluminum Nickel Cobalt (AlNiCo), or any combination of rare earth magnet materials.

Similar to the permanent magnets 120 of FIG. 2, it may be desirable that all of the multiphase stator windings 134 share an identical construction, including material composition, method of manufacture, and final geometry. Each stator winding 134 may be fabricated from a unitary bar conductor, which is formed into a U-shaped geometry that is defined by a pair of hairpin legs that project from opposing ends of a curvilinear hairpin crown. The unitary hairpin bar conductor may take on a rectangular cross-section, a square cross-section, an oval cross-section, a circular cross-section, or any other suitable shape. The hairpin legs are inserted into the slots 132 of the stator body 126, with each leg extending through a different stator slot 132 such that the hairpin crown (also known as an "end-turn") extends over several of the stator slots 132 (e.g., a hairpin crown may extend across three or four or five slots). These hairpin stator windings 134 may be inserted in a "staggered" or "interleaved" pattern with respect to adjacent hairpins. Any given stator slot 132 may include a number of hairpin legs (e.g., four in the illustrated example of FIG. 2). Once all of the hairpin stator windings 134 are inserted into the slots 132 of the stator body 126, the ends of the hairpin legs extending from a longitudinal end of the stator 116 are bent. Electrical connections are then made to each winding 134.

During operation of the electric machine 114, e.g., in a regenerative-charging mode, the rotor assembly 118 is rotated via the motor shaft while the stator assembly 116 is held relatively stationary. In so doing, the permanent magnets 120 are moved past the multiphase stator windings 134; the magnetic field emitted by the permanent magnets 120 generates an electric current in the windings 134 through electromagnetic induction. This induced electric current may be used to power a load (e.g., recharge traction battery pack 30 of FIG. 1). Conversely, during operation of the electric machine 114, e.g., in an engine-cranking mode, an EV motoring mode, or a torque-assist mode, an electric current is supplied to the stator windings 134 by a suitable power source (e.g., traction battery pack 30). Passing the supplied current through the multiphase stator windings 134 will generate a magnetic field at the stator teeth 136. The magnetic field output from the stator teeth 136 interacts with the permanent magnets 120 in the rotor assembly 118 such that the rotor body 128 and attached motor shaft rotate to generate a rotary driving force.

During operation of an electric machine, such as traction motor 14 of FIG. 1 or electric machine 114 of FIG. 2, the metallic material of the high-speed rotor is under very large mechanical stresses, particularly around the internal slots inside of the rotor body. To avoid failure of the rotor at high speeds, some conventional designs incorporate additional metallic material to reinforce the slots. Doing so, however, may have a negative impact on the machine's overall efficiency and performance. For instance, HEV and FEV traction motors may be designed to operate at higher rotational speeds to provision a higher relative power density; mechanical stresses in the steel bridges restrict high-speed motor operation. Computer aided engineering (CAE) simulation and analysis of motor models has shown that incorporation of bonded-in polymeric reinforcement inserts into a select subset of the rotor cavities will help to abate slot stresses and concomitantly enable the motor to operate at higher speeds. Some motor designs eliminate the slot bridges to improve motor efficiency and performance irrespective of the potential for motor failure at high operating speeds.

Rather than add metallic reinforcements to all of the rotor slots or eliminate the slot bridges—with the associated penalties for each option—disclosed stacked-laminate rotor assemblies include geometric features that are positioned throughout the rotor and, for some configurations, vary along the rotational axis of the rotor to promote load transfer between the polymeric reinforcement inserts and the individual rotor laminates. As will be described in extensive detail below with respect to the rotor design of FIG. 3, improved load transfer performance may be achieved by inclusion of radially elongated web features into the slots of select poles of the rotor laminates; the laminates are rotated by a predefined angular offset from one layer to the next to ensure at least one web is present in each pole of the resultant rotor stack. An additional or alternative option for improving load transfer performance is to incorporate radially projecting protrusions and/or radially recessed indentations into one or more or all of the pole slots. Another option includes varying the size and/or location of the laminate barrier slots with respect to the barrier slots of neighboring rotor laminates.

Figure 3:
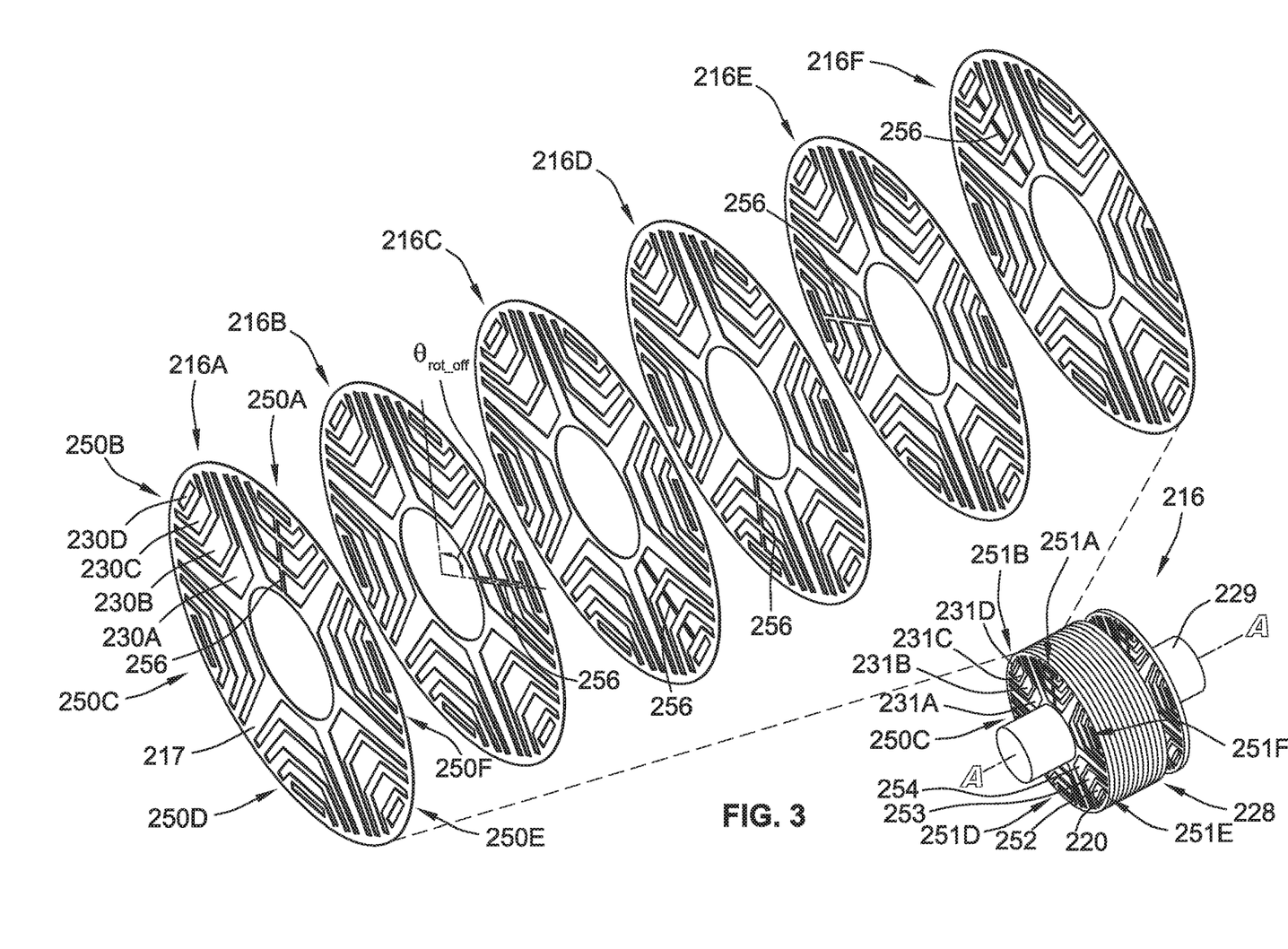
FIG. 3 is a partially exploded, perspective view illustration of a representative stacked-laminate rotor assembly with an alternating structural web feature that enhances load transfer between the rotor laminations and internal polymeric reinforcement inserts in accord with aspects of the disclosed concepts.

Turning next to FIG. 3, there is presented a perspective-view illustration of a representative stacked-laminate rotor assembly 216 with an alternating structural web feature that helps to enhance mechanical load transfer between the individual laminations of the stack and polymeric reinforcement inserts that fill select cavities of the rotor's main body 228. The cylindrical rotor body 228 of the stacked-laminate rotor assembly 216 is a multilayer laminate construction that, as the name implies, is typified by a stack of rotor laminates. While depicted as having a total of thirteen (13) rotor laminates, the rotor assembly 216 stack may comprise greater or fewer laminations than what is shown, typically between about 30 to about 70 individual laminations each having an axial thickness of between about 1.5 mm and about 3.0 mm. In this regard, the rotor body 228 may have an axial length of about 40 mm to about 80 mm and an outer diameter of about 120 mm to about 195 mm. The rotor body 228 may be fabricated from a suitable ferromagnetic material, such as electrical steel, iron, nickel, cobalt, combinations thereof, or the like. Toroidal endplates and clamps (not shown) may be seated on opposing ends of the laminate stack to retain the laminations in place during operation of the electric machine. Moreover, a pair of high-speed axial bearings (also not shown) may rotationally mount the rotor assembly 216 inside a protective motor housing.

An exploded perspective view of a select portion of the rotor assembly 216 illustrates six (6) of the individual rotor laminates—labelled 216A-216F in FIG. 3—that are serially aligned along a rotor output shaft 229. For ease of manufacture and assembly, the rotor laminates 216A-216F may be structurally identical to one another; thus, for brevity and ease of reference, the structure of all illustrated laminations may be described below with reference to the left-most rotor laminate 216A of FIG. 3. For instance, each rotor laminate 216A may be cast, stamped, or machined as a circular metallic disk 217; once formed, these circular disks 217 are stacked in abutting, face-to-face relation and laminated together to form the laminate stack that defines the rotor body 228. Each rotor laminate 216A is formed with six (6) circumferentially spaced, non-salient magnetic poles 250A-

250F, each of which is defined by one or more magnet slots 230A that is/are radially spaced from and, optionally, interleaved with one or more insert slots 230B-230D.

When the rotor's laminate stack is assembled, the magnet slots 230A of the stacked rotor laminates 216A-216F axially align with one another relative to rotational axis A-A of FIG. 3 to cooperatively define the rotor's magnet-bearing slots 231A. In the same vein, the insert slots 230B-230D of the stacked rotor laminates 216A-216F axially align with one another along the rotational axis A-A to cooperatively define the rotor's insert-bearing slots 231B-231D. Magnetic material, such as individual permanent magnet bars 220 (e.g., ferrite, NdFeB, SmCos, etc.), are mounted inside each of the rotor's magnet slots 231A. Conversely, a non-magnetic material, such as polymeric reinforcement inserts 252, 253 and 254 are mounted inside the rotor's insert slots 231B-231C. These reinforcement inserts 252, 253, 254 may be a curable adhesive filler that provides high flexural strength, minimal void content, and full contact area. For example, the reinforcement inserts 252, 253, 254 may exhibit a high modulus of elasticity (e.g., about 10 gigapascal (GPa) or greater), a high tensile strength (e.g., about 50 megapascals (MPa) or greater) and a low coefficient of linear thermal expansion (CLTE) (e.g., about 10-30 parts-per-million per degree centigrade (ppm/C)). In some aspects, the curable filler is an epoxy (e.g., epoxy molding compound), a phenol (e.g., phenolic molding compound), a fiber-reinforced polymer (FRP), a silicone, or a polyurethane. In some aspects, the curable filler may have magnetic properties selected to strengthen the magnetic field of the rotor body. An adhesive/primer with high-adhesion strength, high elongation properties, and increased robustness, such as epoxy, acrylate, polyurethane, polyimide, bismaleimide, etc., may be used to bond the inserts to the rotor body.

With continuing reference to FIG. 3, a select subset of each laminate's poles may be stamped, formed, or machined to include structurally reinforcing slot webs while a select subset of each laminate's poles may be stamped, formed or machined without such webs. Calibrated positioning of these laminations during stacking introduces a slot web feature at select intervals along the stack in all of the resultant rotor poles. In accord with the illustrated example, a first pole 250A of the rotor laminate's magnetic poles 250A-250F is fabricated with an elongated structural web 256 that extends radially through some or all of the laminate's magnet and insert slots 230A-230D of the first pole 250A. As shown, the structural web 256 has a rectangular plan-view profile and extends radially along a rectilinear path through central regions of three of the four laminate slots, namely slots 230A, 230B and 230C. The web 256 may be fabricated as a discrete component that is subsequently welded or otherwise rigidly attached to the circular disks 217. It may be desirable, however, that the circular disk 217 and structural web 256 be cast, stamped, or otherwise integrally formed as a single-piece, unitary structure. While shown with a single web extending radially through three slots of a single pole, it is envisioned that each lamination may be fabricated with: (1) webs in two or more (but not all) poles, (2) multiple webs in each pole, (3) one or more webs that extend in non-radial directions (e.g., circumferentially), and/or (4) webs extending through greater or fewer than three slots.

Continuing with the above discussion, a second pole 250B of the rotor laminate's magnetic poles 250A-250F lacks a structural web within its respective pole slots 230A-230D. According to this representative example, only the first pole 250A of the rotor laminate 216A includes the structural web 256; all remaining poles 250C-250F lack the structural web 256. Alternative configurations may designate every other pole or every third pole as those poles that lack a structural web. With this arrangement, significant material cost savings and motor weight reductions are realized over counterpart designs with added metallic reinforcements. In addition to decreasing motor weight and cost, the illustrated load-transfer improving features help to increase motor operating speeds, power density, and operational life expectancy.

To ensure that at least one web 256 is aligned within each rotor pole 251A-251F of the rotor body 228 after stacking of the laminations, the rotor laminates 216A-216F are rotated relative to one another before they are stacked and laminated together. For the six-pole architecture of stacked-laminate rotor assembly 216 of FIG. 3, the laminations are rotated approximately 60 degrees relative to its neighboring laminate or laminates such that the web 256 occurs in each rotor pole 251A-251-F once in every six laminations. For configurations with greater or fewer than six (6) poles, each rotor laminate includes a total number N of magnetic poles, where N=2×n and n is a positive integer; in this instance, each rotor laminate is rotated a predefined angular offset $\theta_{rot\_off}$ with respect to its immediately preceding rotor laminate, wherein $\theta_{rot\_off}=360/(2\times n)$. In an electric machine with eight (8) poles, such as electric machine 114 of FIG. 2, N=8, n=4, and $\theta_{rot\_off}=45°$.

By way of example, and not limitation, the first rotor laminate 216A in the stack of rotor laminates is oriented with the first pole 250A located at the 12-o-clock position such that the structural web 256 is shown substantially vertical in FIG. 3. Contrastingly, the second rotor laminate 216B is rotated, e.g., clockwise approximately 60 degrees, with respect to the first rotor laminate 216A such that the pole of the second laminate 216B with the structural web 256 is located at the 2-o-clock position in FIG. 3. With this arrangement, the first pole 250A of the first laminate 216A is axially aligned with one of the poles of the second laminate 216B that lacks a web 256, whereas the pole of the second laminate 216B with the web 256 is axially aligned with one of the poles of the first laminate 216A that lacks a web 256. Likewise, the third rotor laminate 216C is rotated, e.g., clockwise approximately 60 degrees, with respect to the second rotor laminate 216B such that the pole of the third laminate 216C with the structural web 256 is located at the 4-o-clock position in FIG. 3. In the same vein, the pole of the fourth laminate 216D with the structural web 256 is located at the 6-o-clock position, the pole of the fifth laminate 216E with the structural web 256 is located at the 8-o-clock position, and the pole of the sixth laminate 216F with the structural web 256 is located at the 10-o-clock position. Consequently, each pole with a web 256 axially aligns with poles of adjacent laminates without the structural web 256.

Figure 4:
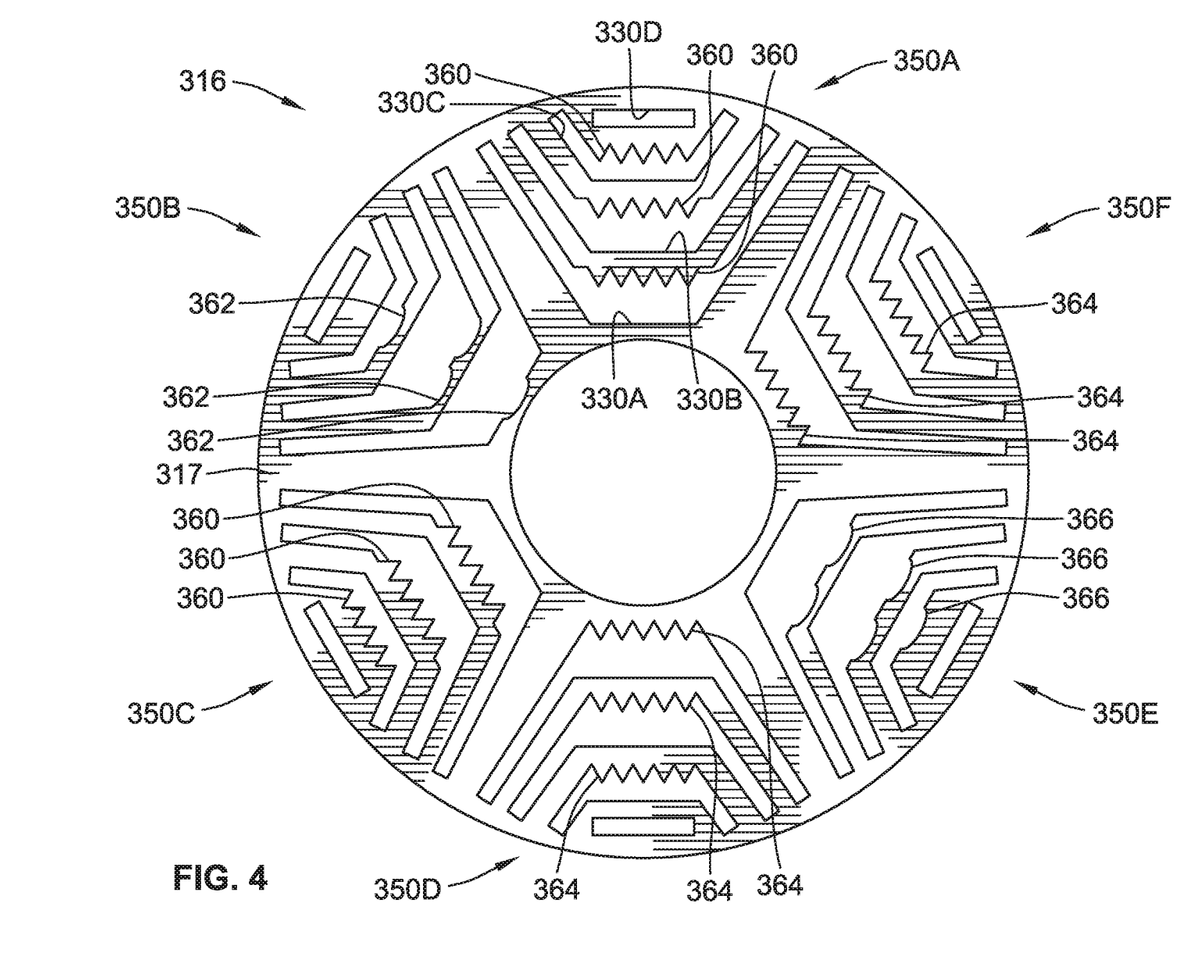
FIG. 4 is a plan-view illustration of a representative rotor laminate with a pattern of alternating slot protrusions and slot indentations that enhances load transfer between the rotor laminations and internal polymeric reinforcement inserts in accord with aspects of the disclosed concepts.

With reference next to FIG. 4, there is shown an illustration of another representative rotor laminate 316 with a pattern of alternating slot protrusions and slot indentations that enhances load transfer between the rotor laminate and any slot-borne polymeric reinforcement inserts. Although differing in appearance, it is envisioned that any of the features and options set forth above with reference to the rotor laminates of FIG. 3 can be incorporated, singly or in any combination, into the rotor laminate of FIG. 4, FIG. 5 and/or FIG. 6, and vice versa. For instance, the rotor laminate 316 of FIG. 4 may be fabricated as a circular metallic disk 317 that is configured to be stacked in abutting, face-to-face relation with a series of rotor laminates to form a laminate stack that defines a rotor body, such as rotor body 228 of FIG. 3. Similar to laminate 216A of FIG. 3, rotor laminate 316 of FIG. 4 includes six (6) circumferentially spaced, non-salient magnetic poles 350A-350F, each of which is defined by one or more magnet slots 330A that is/are radially spaced from and, optionally, interleaved with one or more insert slots 330B-330D.

Continuing with the discussion of rotor laminate 316 of FIG. 4, the first, second and third laminate insert slots 330A-330C of the first and third poles 350A and 350C each includes a row of triangular teeth 360 that project radially inward from a respective edge of that slot. By way of contrast, the first, second and third laminate insert slots 330A-330C of the second pole 350B each includes one or more semicircular indentations 362 that are recessed radially inward into a respective edge of that slot. On the other hand, the first, second and third laminate insert slots 330A-330C of the fourth and sixth poles 350D and 350F each includes a row of triangular teeth 364 that project radially outward from a respective edge of that slot. Lastly, the first, second and third laminate insert slots 330A-330C of the fifth pole 350E each includes one or more semicircular indentations 366 that are recessed radially outward into a respective edge of that slot. It is envisioned that a rotor laminate 316 may include only one type of the slot projections/indentations illustrated in FIG. 4 or, alternatively, may include any combination of number, type, shape, location of surface indentations and/or surface projections.

The inclusion of protrusions or indentations that only partially bridge a slot would allow for additional contact surface areas to bond to a polymeric insert. The protrusions/indentations may be cast, stamped, or otherwise integrally formed with the disk-shaped body of the lamination as a one-piece structure. As yet a further option, the protrusions/indentations may be limited to select slots and/or select slot edges or could be on any or all slots/slot surfaces. For at least some embodiments, protrusions would only be placed at locations shown to have the highest stresses or to reduce stress concentrations. Additional space could be maintained between the protrusions by alternating their position from one pole to the next; this additional space may help to minimize flux leakage. The protrusion/indentation shapes and sizes may vary from that which are shown in FIG. 4.

Figure 5:
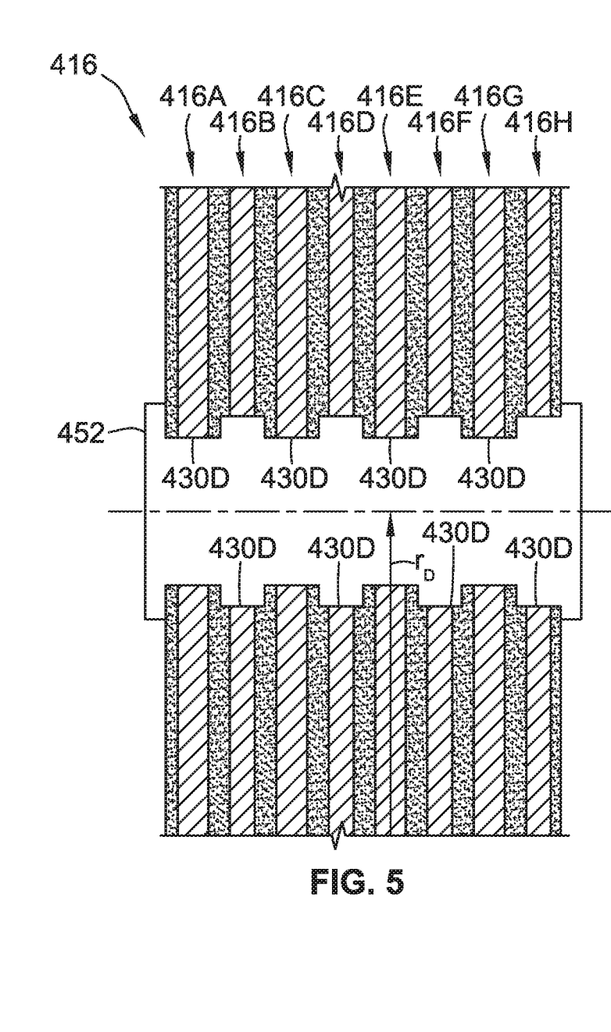
FIG. 5 is a cutaway, side-view illustration of another representative stacked-laminate rotor assembly with an alternating slot size feature that enhances load transfer between the rotor laminations and internal polymeric reinforcement inserts in accord with aspects of the disclosed concepts.
Figure 6:
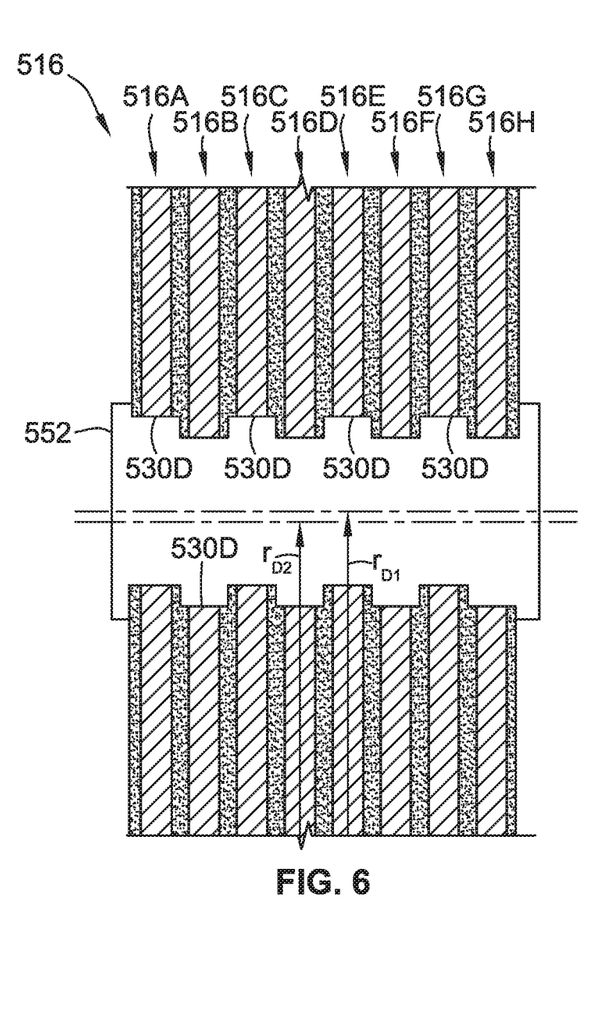
FIG. 6 is a cutaway, side-view illustration of yet another representative stacked-laminate rotor assembly with an alternating slot position feature that enhances load transfer between the rotor laminations and the polymeric reinforcement inserts in accord with aspects of the disclosed concepts.

FIGS. 5 and 6 illustrate two more representative stacked-laminate rotor assemblies 416 and 516, respectively, with an alternating slot size feature (FIG. 5) and an alternating slot position feature (FIG. 6) that enhance load transfer between the laminations and an internal polymeric reinforcement insert 452 and 552. In particular, a laminate insert slot 430D of a first rotor laminate 416A is axially aligned with complementary laminate insert slots 430D of the remaining rotor laminates 416A-416H in a stack of laminates and, thus, all share a common radial (centerline) position $r_D$ with respect to a rotational axis of the rotor assembly 416. The laminate insert slots 430D of the first, third, fifth and seventh laminates 416A, 416C, 416E and 416G share a first slot size (e.g., first common slot height in FIG. 5), whereas the laminate insert slots 430D of the second, fourth, sixth and eighth laminates 416B, 416D, 416F and 416H share a second slot size (e.g., second common slot height) that is greater than the first slot size. As yet a further option, the laminate insert slots 530D of all eight rotor laminates 516A-516H share a common slot size; however, the laminate insert slots 530D of the first, third, fifth and seventh laminates 516A, 516C, 516E and 516G share a first common radial (centerline) position $r_{D1}$, whereas the laminate insert slots 530D of the second, fourth, sixth and eighth laminates 516B, 516D, 516F and 516H share a second common radial (centerline) position $r_{D2}$ that is distinct from the first common radial (centerline) position $r_{D1}$.

By making some of the slots slightly narrower than their immediately adjacent neighboring slots, as shown in FIG. 5, an undulating longitudinal cross-sectional surface is created which, in turn, provides additional contact surface area for the polymeric reinforcement insert 452. In a similar regard, each slot in a series of axially aligned slots may be radially offset with respect to its immediately adjacent neighboring slots, as shown in FIG. 6, such that an undulating longitudinal cross-sectional surface is created which, in turn, provides additional contact surface area for the polymeric reinforcement insert 552. Such interlocking geometries may enable the polymeric material to hold the laminations together until end rings are assembled onto the rotor shaft. This may optionally eliminate the need for adhesive between the laminations or welding to hold the stack together. These features could be dedicated to a rotor hole that is specially formed for interlocking the laminations together.

There are quantifiable benefits to utilizing "unidentical" flux barrier designs for alternative poles in a polymer-reinforced rotor laminate assembly. For instance, at least some of the disclosed rotor assembly configurations may allow stress homogenization in radial and axial directions. In addition, the laminates may still rotate when stacked to minimize footprint on the magnetic design. An unidentical flux barrier may be defined by a first laminate slot of a first pole at a first radial distance from the rotational axis of the rotor having a first radial size, a first circumferential size and a first angular pitch, whereas the first laminate slot of a second pole at the first radial distance from the rotational axis of the rotor has a second radial size, a second circumferential size and a second angular pitch, one or more of which are distinct from their respective counterparts of the first laminate slot of the first pole.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A rotor assembly for an electric machine, the electric machine including a stator and an electrically conductive winding attached to the stator, the rotor assembly comprising:
   a rotor body rotatably mounted adjacent the stator, the rotor body including a stack of rotor laminates, each of the rotor laminates including circumferentially spaced poles each defined by a plurality of slots in the rotor laminate, and each of the circumferentially spaced poles including a first pole with first slots and a second pole with second slots,
   wherein the first slots of the first pole of each of the rotor laminates include a first structural arrangement with a structural web extending radially through the first slots, and the second slots of the second pole of each of the rotor laminates include a second structural arrangement, distinct from the first structural arrangement, that lacks a structural web extending radially through the second slots, only the first pole of each of the rotor laminates including the structural web and all remaining ones of the poles of each of the rotor laminates lacking the structural web, wherein a first rotor laminate in the stack of rotor laminates is rotated with respect to a second rotor laminate to thereby align the first pole of the first rotor laminate with the second pole of the second rotor laminate such that a bulk structural material within a slot of the second pole of the second rotor laminate contacts an axial face of the first rotor laminate.

2. The rotor assembly of claim 1, wherein the first rotor laminate is rotated with respect to the second rotor laminate such that the first pole of the first rotor laminate with the structural web axially aligns with the second pole the second rotor laminate without the structural web, and the first pole of the second rotor laminate with the structural web axially aligns with the second pole of the first rotor laminate without the structural web.

3. The rotor assembly of claim 1, wherein the structural web extends radially through central regions of the first slots of the first pole.

4. The rotor assembly of claim 1, wherein the structural web is integrally formed with the rotor laminate to define a single-piece, unitary structure.

5. The rotor assembly of claim 1, wherein each of the rotor laminates includes a total number N of the poles, where N=2×n and n is a positive integer, and wherein the first rotor laminate is rotated a predefined angular offset $\theta_{rot\_off}$ with respect to the second rotor laminate, wherein $\theta_{rot\_off}$=360/(2×n).

6. The rotor assembly of claim 1, wherein the plurality of slots defining each of the poles of the rotor laminates includes one or more laminate magnet slots radially spaced from one or more laminate insert slots, each of the laminate magnet slots being configured to support therein a magnet, and each of the laminate insert slots being configured to support therein a polymeric insert.

7. The rotor assembly of claim 1, wherein each of the rotor laminates includes a circular metallic disk, and wherein the circular metallic disks are laminated together in abutting face-to-face relation to form the stack of rotor laminates.

8. The rotor assembly of claim 1, wherein the first structural arrangement includes a series of the first slots having a first radial position with respect to a rotational axis of the rotor body, and the second structural arrangement includes a series of the second slots having a second radial position distinct from the first radial position with respect to the rotational axis of the rotor body, and wherein each of the first slots is axially aligned with a respective one of the second slots.

9. The rotor assembly of claim 1, wherein the first structural arrangement includes a series of the first slots having a first slot size, and the second structural arrangement includes a series of the second slots having a second slot size larger than the first slot size, and wherein each of the first slots is axially aligned with a respective one of the second slots.

10. The rotor assembly of claim 1, wherein the first structural arrangement includes a plurality of radially protruding projections and/or a plurality of radially recessed indentations.

11. The rotor assembly of claim 1, wherein the rotor body includes a plurality of permanent magnets and a plurality of epoxy polymer inserts.

12. An electric machine comprising:
an annular stator with a hollow core and defining multiple stator winding slots;
a plurality of electrically conductive windings disposed in the stator winding slots;
a cylindrical rotor rotatably mounted inside the hollow core of the stator, the rotor including a stack of rotor laminates each including multiple circumferentially spaced poles, each of the poles defined by a laminate magnet slot spaced from a laminate insert slot, the laminate magnet slots of the rotor laminates cooperatively defining multiple rotor magnet slots of the rotor, and the laminate insert slots of the rotor laminates cooperatively defining multiple rotor insert slots of the rotor;
a plurality of permanent magnets mounted inside the rotor magnet slots; and
a plurality of non-magnetic polymeric inserts mounted inside the rotor insert slots,
wherein a first pole of the poles of each of the rotor laminates includes a structural web extending radially through the laminate magnet slot and the laminate insert slot of the first pole, and a second pole of the poles of each of the rotor laminates lacks the radially extending structural web, only the first pole of each of the rotor laminates including the structural web and all remaining ones of the poles of each of the rotor laminates lacking a structural web, and
wherein a first rotor laminate in the stack of rotor laminates is rotated with respect to a second rotor laminate such that the first pole of the first rotor laminate with the structural web axially aligns with the second pole the second rotor laminate without the structural web, and the first pole of the second rotor laminate with the structural web axially aligns with the second pole of the first rotor laminate without the structural web.

13. A method of assembling a rotor assembly for an electric machine, the method comprising:
providing a plurality of rotor laminates, each of the rotor laminates including circumferentially spaced poles each defined by a plurality of slots in the rotor laminate, wherein first slots of a first pole of each of the rotor laminates include a first structural arrangement with a structural web extending radially through the first slots, and second slots of a second pole of each of the rotor laminates include a second structural arrangement, distinct from the first structural arrangement, that lacks a structural web extending radially through the second slots, only the first pole of each of the rotor laminates including the structural web and all remaining ones of the poles of each of the rotor laminates lacking the structural web; and
stacking the plurality of rotor laminates to define a rotor body of the rotor assembly, wherein a first rotor laminate in the stack of rotor laminates is rotated with respect to a second rotor laminate to thereby align the first pole of the first rotor laminate with the second pole of the second rotor laminate such that a bulk structural material within a slot of the second pole of the second rotor laminate contacts an axial face of the first rotor laminate.

14. The method of claim 13, wherein each of the rotor laminates includes a total number N of the poles, where N=2×n and n is a positive integer, and wherein the first rotor laminate is rotated a predefined angular offset $\theta_{rot\_off}$ with respect to the second rotor laminate, wherein $\theta_{rot\_off}$=360/(2×n).

15. The method of claim 13, further comprising inserting a plurality of permanent magnets and a plurality of epoxy polymer inserts into the rotor body.

16. The method of claim 13, wherein each of the rotor laminates includes a circular metallic disk, and wherein the circular metallic disks are laminated together in abutting face-to-face relation to form the stack of rotor laminates.

17. The method of claim 13, wherein the structural web extends radially through central regions of the first slots of the first pole.

18. The method of claim 13, wherein the first structural arrangement includes a series of the first slots having a first slot size, and the second structural arrangement includes a series of the second slots having a second slot size larger than the first slot size, and wherein each of the first slots is axially aligned with a respective one of the second slots.

19. The method of claim 13, wherein the first structural arrangement includes a plurality of radially protruding projections and/or a plurality of radially recessed indentations.

20. The method of claim 13, further comprising attaching a plurality of permanent magnets and a plurality of epoxy polymer inserts to the rotor body.

* * * * *